US012367357B1

(12) United States Patent
Patel et al.

(10) Patent No.: US 12,367,357 B1
(45) Date of Patent: Jul. 22, 2025

(54) ACTIVATING A SMART LABEL VIA CONTACT

(71) Applicant: ROAMBEE Corporation, Santa Clara, CA (US)

(72) Inventors: Pankaj Patel, Santa Clara, CA (US); Vidya Subramanian, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 0 days.

(21) Appl. No.: 18/071,579

(22) Filed: Nov. 29, 2022

(51) Int. Cl.
*G06K 19/077* (2006.01)
*G06K 7/10* (2006.01)

(52) U.S. Cl.
CPC ..... *G06K 7/10425* (2013.01); *G06K 7/10376* (2013.01); *G06K 19/07749* (2013.01)

(58) Field of Classification Search
CPC ....... G06K 19/07758; G06K 19/06028; G06K 19/06112; G06K 19/07; G06K 19/0705; G06K 19/0717; G06K 19/0723; G06K 19/07701; G06K 19/07705; G06K 19/07762; G06K 19/07773; G06K 7/10158; G06K 7/10366; G06K 7/1413; G06K 1/121; G06K 19/0702; G06K 19/07728; G06K 19/07749; G06K 17/00; G06K 17/0025; G06K 19/025; G06K 19/0704; G06K 19/071; G06K 19/0716; G06K 19/07309; G06K 19/07345; G06K 19/07718; G06K 19/0776; G06K 7/0008; G06K 7/10316; G06K 13/073; G06K 13/28; G06K 19/0707; G06K 19/0708; G06K 19/0709; G06K 19/0715; G06K 19/0722; G06K 19/0728; G06K 19/07707; G06K 19/07716; G06K 19/07722; G06K 19/07766; G06K 19/07786; G06K 7/0004; G06K 7/10019; G06K 7/10079; G06K 7/10336; G06K 7/10465; H04W 4/029; H04W 4/80; H04W 4/021; H04W 4/027; H04W 4/23; H04W 4/35; H04W 4/38; A63B 2024/0025; A63B 2071/0688; A63B 2225/54; A63B 24/0021; A63B 71/0686; G01K 1/024; G01N 25/18; G01N 2035/00861; G06Q 10/0832; G06Q 10/087; G06Q 30/018; G06Q 30/02; G06Q 30/0281; G06Q 30/0639; G06Q 30/0643; G06Q 10/0833; G06Q 10/08; G06Q 30/06;

(Continued)

(56) References Cited

U.S. PATENT DOCUMENTS 6,010,257 A 1/2000 Petteruti et al.
6,593,853 B1 7/2003 Barrett et al.

(Continued)

OTHER PUBLICATIONS

PCT International Search Report issued in the international application No. PCT/US23/81452, mailed on Mar. 13, 2024.

*Primary Examiner* — Dionne Pendleton

(57) ABSTRACT

One example method may include detecting a radio enabled label moving through an area, performing one or more contact operations to the radio enabled label, activating a power source embedded in the radio enabled label responsive to the one or more contact operations, and performing one or more of receiving and transmitting a radio signal via the radio enabled label while the power source is activated.

14 Claims, 16 Drawing Sheets

(58) Field of Classification Search
CPC .. G06Q 10/06; G06Q 10/06316; G06Q 10/10; G06Q 20/327; G06Q 20/341; G06Q 20/4014; G06Q 20/40145; G06Q 30/0601; G06Q 50/06; G06Q 50/40; H01Q 7/00; H01Q 1/2208; H01Q 1/2225; G07C 1/24; G07C 9/00182; G07C 9/257; G07C 9/26; H04B 5/24; H04B 5/77; H04B 5/20; H04B 5/72; H04N 1/32138; H01M 2220/30; H01M 50/105; H01M 50/141; H01M 50/211; H01M 50/247; H01M 50/519; G09F 2003/0202; G09F 2003/0229; G09F 2003/0257; G09F 2003/0272; G09F 3/02; G09F 3/0297; G09F 9/372; G09F 2003/0214; G09F 2003/0255; G09F 3/0292; G09F 3/0335; B65C 2009/0053; B65C 9/36; B65C 7/00; B65C 2009/0003; B65C 9/26; B65C 9/46; Y10T 156/1768; Y10T 156/12; Y10T 156/125; Y10T 156/16; Y10T 156/171; B41J 11/46; B41J 11/666; B41J 11/703; B41J 3/4075; B41J 3/50; B41J 29/393; B41J 11/009; B41J 15/044; B41J 17/36; B41J 2029/3937; B41J 29/46; B41J 3/36; B41J 3/407; B41J 35/36; G06F 3/1454; G06F 3/147; G06F 11/1004; G06F 15/00; G06F 21/35; G06F 3/1219; G06F 3/1239; G09G 2300/023; G09G 2370/16; G09G 2380/04; G09G 3/344; G16H 10/40; G16H 20/13; G16H 40/67; G16H 20/10; G16H 40/20; B01L 3/545; A01K 11/004; A01K 11/006; A01K 29/005; B32B 2038/047; B32B 2255/205; B32B 2457/00; B32B 3/266; B32B 37/12; B32B 38/04; G01S 13/825; G01S 13/876; G01S 15/74; G01S 17/74; G01S 5/0278; G01S 5/0289; G06N 20/00; G06N 5/04; G07F 7/1008; G16Z 99/00; H02J 7/0013; H02J 7/0042; Y02D 30/70; Y04S 10/50

See application file for complete search history.

(56) References Cited

U.S. PATENT DOCUMENTS

| | | | |
|---|---|---|---|
| 6,924,781 | B1 | 8/2005 | Gelbman |
| 7,715,593 | B1 | 5/2010 | Adams et al. |
| 7,741,967 | B2 | 6/2010 | Valeriano et al. |
| 7,791,481 | B2 | 9/2010 | Landt et al. |
| 7,922,073 | B2 | 4/2011 | Huerga |
| 9,239,941 | B1 | 1/2016 | Diorio |
| 11,232,390 | B1 | 1/2022 | Leung et al. |
| 11,321,652 | B1 | 5/2022 | Mahmood |
| 11,354,556 | B1 | 6/2022 | Joehren |
| 11,392,783 | B2 | 7/2022 | Hilbert |
| 2002/0138355 | A1 | 9/2002 | Briggs et al. |
| 2003/0104848 | A1 | 6/2003 | Brideglall |
| 2005/0030160 | A1 | 2/2005 | Goren et al. |
| 2006/0192655 | A1 | 8/2006 | Levin |
| 2006/0275065 | A1 | 12/2006 | Bunsey et al. |
| 2007/0040683 | A1 | 2/2007 | Oliver et al. |
| 2008/0093027 | A1 | 4/2008 | Niwa et al. |
| 2008/0297320 | A1 | 12/2008 | Kawae et al. |
| 2011/0091216 | A1 | 4/2011 | Addy |
| 2014/0188502 | A1 | 7/2014 | Defrank et al. |
| 2014/0353368 | A1 | 12/2014 | Connolly et al. |
| 2014/0375429 | A1 | 12/2014 | Cristache |
| 2015/0347791 | A1 | 12/2015 | Desai et al. |
| 2016/0379102 | A1* | 12/2016 | Ferguson ............ G06Q 10/087 235/385 |
| 2017/0364927 | A1* | 12/2017 | Atkinson ......... G06K 19/06028 |
| 2019/0236424 | A1* | 8/2019 | Atkinson ......... G06K 19/07707 |
| 2019/0279063 | A1 | 9/2019 | Miettinen et al. |
| 2019/0325174 | A1 | 10/2019 | Ashaari et al. |
| 2019/0354734 | A1 | 11/2019 | Forster |
| 2021/0081740 | A1 | 3/2021 | Mak et al. |
| 2021/0088387 | A1* | 3/2021 | Bonifas ................. G01N 25/18 |
| 2021/0150159 | A1 | 5/2021 | Volkerink et al. |
| 2021/0383725 | A1 | 12/2021 | Dehmubed et al. |
| 2022/0327342 | A1* | 10/2022 | Haslam ............... G06K 19/025 |
| 2023/0015023 | A1 | 1/2023 | Lauwers et al. |
| 2023/0028603 | A1 | 1/2023 | Volkerink et al. |
| 2023/0157260 | A1 | 5/2023 | Herron et al. |
| 2024/0029589 | A1* | 1/2024 | Krejcarek ............. G06K 1/121 |

* cited by examiner

ACTIVATING A SMART LABEL VIA CONTACT

TECHNICAL FIELD

This application generally relates to radio embedded smart labels and more particularly to activating a smart label.

BACKGROUND

The costs for radio transmitting labels continues to fall and the demand to track most all types of goods continues to rise. The conventional process of having a person wave a radio transmitter/receiver in front of a radio enabled (radio frequency (RF), radio frequency identification (RFID), near field communication (NFC), etc.) label or similar device, every time the shipment arrives or is sent out of a packaging and/or logistics facility. There may even be automatic radio readers which detect and log events and locations when the boxes, envelopes, etc., which include radio devices pass within a certain radius of the radio reader devices.

A large amount of time and a large number of devices are required to assign a code/identifier to a smart label, print content on the smart label, assign a code to the smart label, initiate the radio transmissions of the radio embedded in the smart label, update a database, track the label, further update the database after periods of time, notify interested parties of changes, confirm the smart labels are in a particular location and ensure the final destination is reached.

Additionally, the tiny batteries which are embedded inside the smart labels may have a limited life cycle assuming that charging the batteries of those smart labels is not possible. Cellular, BLUETOOTH, and related technologies can require large amounts of battery charge to transmit wireless communication signals. Once a smart label is activated it may not be capable of being easily turned off to save energy.

SUMMARY

One example embodiment may provide a method that includes one or more of various operations. The method may include one or more of detecting a radio enabled label is within a range of a sensor as the radio enabled label moves through an area, identifying an identifier to assign to the radio enabled label, transmitting a radio signal comprising the identifier to the radio enabled label to activate the radio enabled label, and determining via a microcontroller embedded in the radio enabled label whether to store the identifier when the identifier comprises new information compared to an existing identifier stored in a memory embedded in the radio enabled label.

Another example embodiment may include an apparatus that includes a processor configured to detect a radio enabled label is within a range of a sensor as the radio enabled label moves through an area, identify an identifier to assign to the radio enabled label, transmit a radio signal comprising the identifier to the radio enabled label to activate the radio enabled label, and determine via a microcontroller embedded in the radio enabled label whether to store the identifier when the identifier comprises new information compared to an existing identifier stored in a memory embedded in the radio enabled label.

Still another example embodiment may include a non-transitory computer readable storage medium configured to store instructions that when executed cause a processor to perform detecting a radio enabled label is within a range of a sensor as the radio enabled label moves through an area, identifying an identifier to assign to the radio enabled label, transmitting a radio signal comprising the identifier to the radio enabled label to activate the radio enabled label, and determining via a microcontroller embedded in the radio enabled label whether to store the identifier when the identifier comprises new information compared to an existing identifier stored in a memory embedded in the radio enabled label.

Still yet another example embodiment may include a method that includes detecting a change in a light impulse via a light sensor embedded in a radio enabled label, activating a power source embedded in the radio enabled label, identifying identifier information to receive at the radio enabled label, and receiving a radio signal at the radio enabled label comprising the identifier information.

Still yet another example embodiment may include an apparatus that includes a processor configured to detect a change in a light impulse via a light sensor embedded in a radio enabled label, activate a power source embedded in the radio enabled label, identify identifier information to receive at the radio enabled label, and receive a radio signal at the radio enabled label comprising the identifier information.

Still yet another example embodiment may include a non-transitory computer readable storage medium configured to store instructions that when executed cause a processor to perform detecting a change in a light impulse via a light sensor embedded in a radio enabled label, activating a power source embedded in the radio enabled label, identifying identifier information to receive at the radio enabled label, and receiving a radio signal at the radio enabled label comprising the identifier information.

Still yet another example embodiment may include a method that includes detecting a radio enabled label moving through an area, performing one or more contact operations to the radio enabled label, activating a power source embedded in the radio enabled label responsive to the one or more contact operations, and performing one or more of receiving and transmitting a radio signal via the radio enabled label while the power source is activated.

Still yet another example embodiment may include an apparatus that includes a processor configured to detect a radio enabled label moving through an area, perform one or more contact operations to the radio enabled label, activate a power source embedded in the radio enabled label responsive to the one or more contact operations, and perform one or more of receiving and transmitting a radio signal via the radio enabled label while the power source is activated.

Still yet another example embodiment may include a non-transitory computer readable storage medium configured to store instructions that when executed cause a processor to perform detecting a radio enabled label moving through an area, performing one or more contact operations to the radio enabled label, activating a power source embedded in the radio enabled label responsive to the one or more contact operations, and performing one or more of receiving and transmitting a radio signal via the radio enabled label while the power source is activated.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Figure 1A:
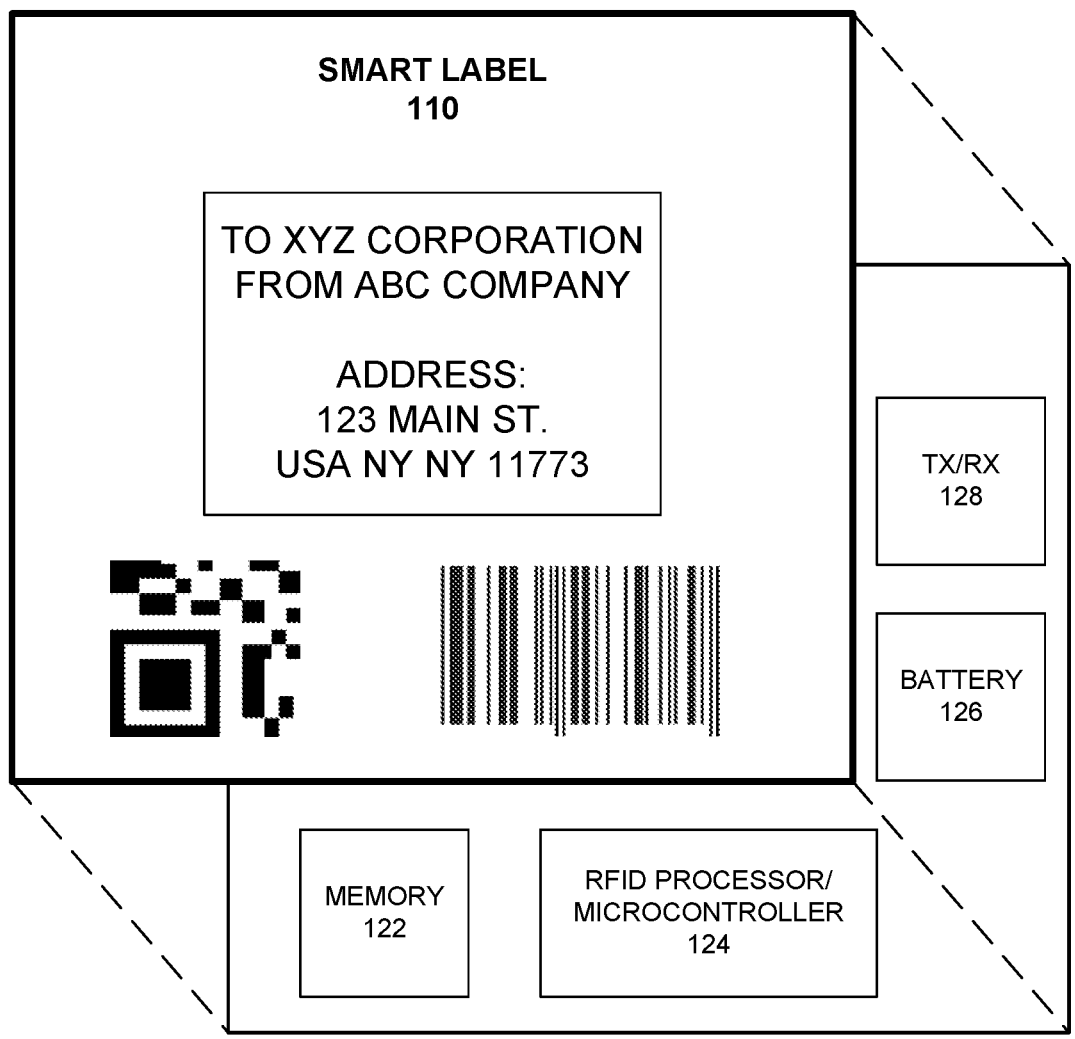
FIG. 1A illustrates a smart label with embedded hardware elements for corresponding communication and operation according to example embodiments.

FIG. 1A illustrates a smart label with embedded hardware elements for corresponding communication and operation according to example embodiments. Referring to FIG. 1A, the smart label configuration 110 may include a printable surface where a printer can print words and symbols received from a memory of the printer. The label may include printed information, such as name, locations, addresses, carrier information, content information, bar codes, QR codes, etc. The label may be substantially flat as a printable instrument like a piece of paper but obviously thicker to house the embedded hardware necessary to receive information to encode and store information in the smart label as well as transmit and receive information via the smart label. The label 110 may include a printable surface and underneath embedded components may include a transmitter/receiver (TX/RX) pair 128 including an antenna, a battery 126 to provide power to the transmitter/receiver and to a processor/microcontroller 124 and memory 122. The smart label 110 may have the capability to store information received wirelessly by a provisioning device such as a provisioning printer 200 (see FIG. 2). Also, the example illustration may not include a battery as that is optional with RFID tags.

Figure 1B:
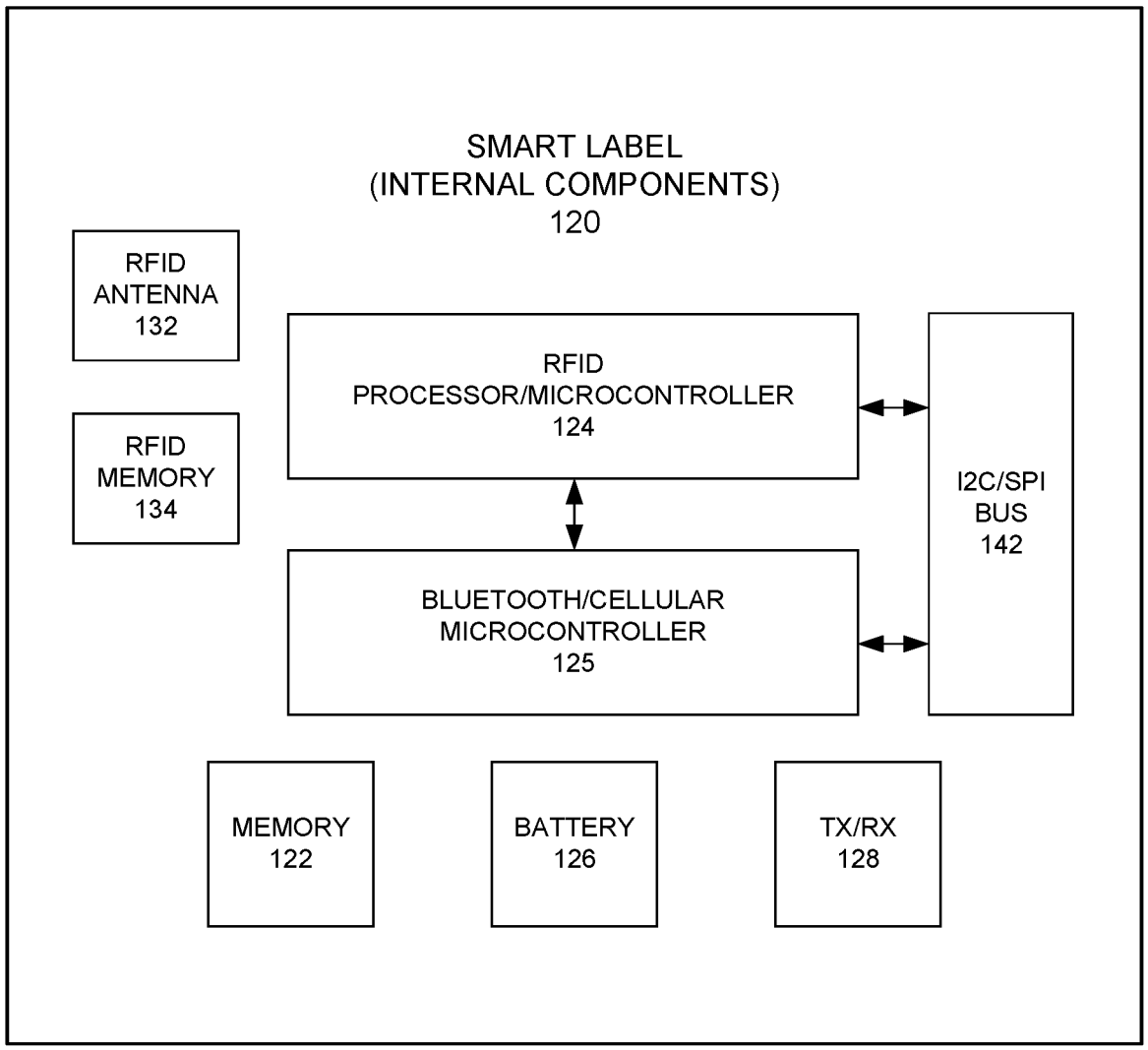
FIG. 1B illustrates a smart label with more than one microcontroller according to example embodiments.

FIG. 1B illustrates an example where the smart label has more than one type of controller. In this example, the RFID microcontroller 124 may be provisioned by a radio device and the radio procedure may alert or "wake-up" the additional microcontroller 125, which may require more power and/or a different data interface to provision with a unique code or similar data. During the provisioning of the RFID tag, the information may be stored in a memory 134. Once the Bluetooth or cellular microcontroller is needed, the provisioning may be performed by the memory 122 to the additional microcontroller prior to attempting to transmit a signal from the additional microcontroller 125.

An RFID label may be energized through an external reader and the 'energy' received is used by the RFID chip to either store information in its memory 134 or to transmit its ID to the reader. The typical process of programming an RFID chip 124 includes the RFID reader reading tags in front of it by sending out radio energy by the antenna 132, and reading tags around it by sending an ID. The RFID reader selects a single ID and forwards it in a programming mode and then sends an ID to the chip. The RFID chip 124 stores the ID in its own memory 134. The process of moving the ID from the RFID reader is initiated by the RFID chip and cannot be performed by a secondary microprocessor. The process of sharing the ID will include the RFID chip writing the ID to its memory 134 and also sending a signal on a communications channel (I2C/SPI (serial peripheral interface) bus 142) between the RFID chip and a second microprocessor 125. The signal will indicate to the microprocessor 125 that data is being sent. The microprocessor 125 will read the data and store it in a secondary memory 122 that can be read by all radio chips in the label. The secondary radio chip(s) (e.g., BLUETOOTH—BLE, cellular—GSM, LTE, etc.) will read the memory location for a "broadcast ID" and then begin to broadcast the ID through their respective radio protocols. The provisioning of the secondary controller chips (125) may be performed at a later time after the primary RFID chip is provisioned with an ID. The decision to wait may be based on saved energy. For example, as the chip moves with a shipment to a location where BLE or cellular communication is necessary for updated status information, then the BLE chip may be provisioned accordingly and may then be able to start broadcasting its own ID via BLE and/or cellular protocols.

In one example, an RFID printer may emit a radio wave that programs a RFID tag, once this occurs, another circuit may read and confirm the information and extract the information or intercept the ID as programmed in the RFID microcontroller and then attempt to programs another microprocessor that is compatible with Bluetooth and/or cellular. The ability to track a shipment via RFID and other communication mediums is then possible since the ID assigned to the smart label is provided from the original server (e.g., unique ID) and programmed into the microcontroller and in a database maintained by the server. The same ID should be assigned to cellular and/or Bluetooth and the microprocessor can then transmit that ID.

Figure 2:
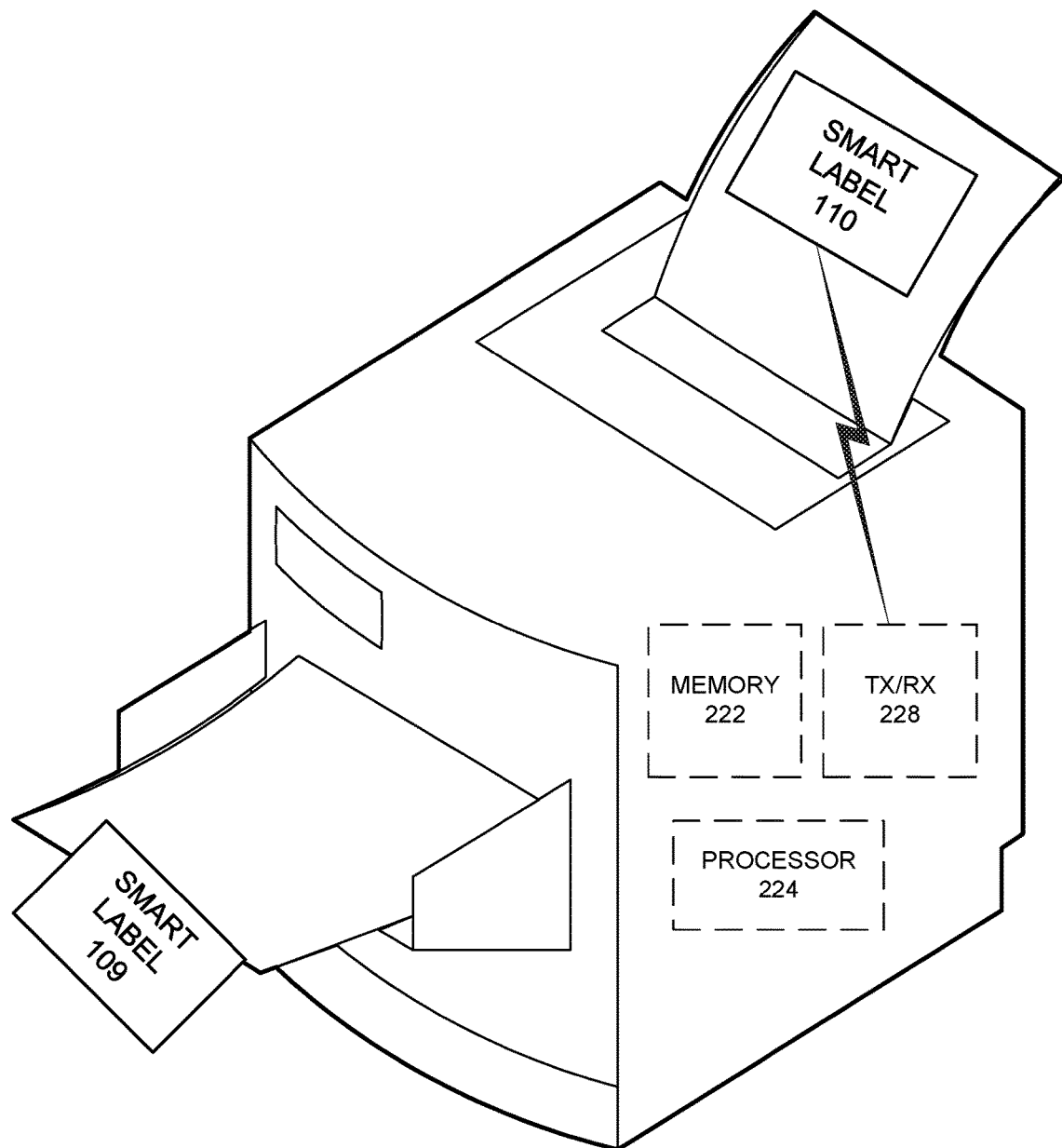
FIG. 2 illustrates a smart label printer configuration according to example embodiments.

FIG. 2 illustrates a smart label printer configuration according to example embodiments. Referring to FIG. 2, the radio provisioning printer 200 may include a standard printing architecture including ink, paper rolling mechanisms and motion caused by motors, gears and related components (not shown) necessary to move paper through the printer and print onto a surface of the paper. However, in addition to being capable of printing, the printer may have a radio encoding device that forwards a wireless signal to the smart label as it passes through the printer. The printer 200 may receive provisioning information from a local computer via a wired or wireless communication to the printer 200. The information may be stored in the printer memory 222. The printer processor 224 may transmit a command to the transmitter/receiver 228 to initiate a radio assignment process where the information printed on the label surface is stored in a memory of the smart label, as well as information pertaining to what wireless communication protocol to use (cellular, Wi-Fi, Bluetooth, Bluetooth low energy (BLE), LoRA, SigFox, etc.), when to transmit update information (e.g., once a day, once a week, once an hour, etc.). The smart label 109 may be in a 'stealth' or 'off' mode prior to passing through the printer. The label 110 may be active once it passes through the printer and may begin to attempt communication with other radio sources to share information stored on the label or to update the label with received information. In this example the printer may have an RFID communication interface or other radio interface.

In operation, when a smart label 110 has entered the printer 200 and information is printed on the label surface, the tag may be provisioned to assign specific information to the smart label. The embedded RFID tag or related hardware of the smart label and its embedded communication circuit (Cellular, Wi-Fi, BLE, etc.) will extract/read the RFID tag details and send the information directly from the smart label to a cloud server and/or directly from the smart label to the printer which has a network interface to communicate with a local computing device which connects to the Internet and shares the smart label information with a server and database to update a new record for the recently provisioned smart label. The process of assigning information to the tag, reading the RFID tag information assigned and communicating the information the cloud may all be part of the provisioning of the smart label 110. The smart label 110 is illustrated as entering the printer and the smart label 109 is illustrated as having already been provisioned by the printer.

In another example, when a smart Internet of things (IoT) label/device (e.g., sensor, location identifier, cellular compatible, Wi-Fi compatible, etc.) is added to the smart label, the RFID identifier and the smart IoT label/device identifier need to both be identified. The RFID tag and the smart IoT label/device will require the capability to read/write embedded the RFID tag independent of the RFID reader or writer and automate the process of provisioning or combining the smart label/device and the RFID identifiers. The smart label should be capable of accessing the embedded RFID information and sending the information to the Internet and on to a cloud server and to create assignment/combinations of provisioning, activating the journey/device with no user interactions.

One example method of operation may include identifying, via a printer, such as a smart label communicative printer, a smart label with an embedded radio chip with memory and a powers source among other hardware components. The process may also include retrieving, via the printer, an identifier to assign to the smart label, printing, via the printer, label information on the smart label while moving the label through a printer track of the printer, and assigning, via a transmitter radio of the printer, identifier information to the memory during the smart label printing. The process may also include broadcasting the identifier information to a computing device which forwards the identifier information to a database and transmitting a beacon signal to the smart label to identify a location of the smart label after the identifier information is stored in the database. Once the smart label is provisioned and activated via the printer, the smart label automatically establishes communications with the remote management server and the corresponding database so the updates of location and status can be maintained from the moment the smart label is setup.

Figure 3:
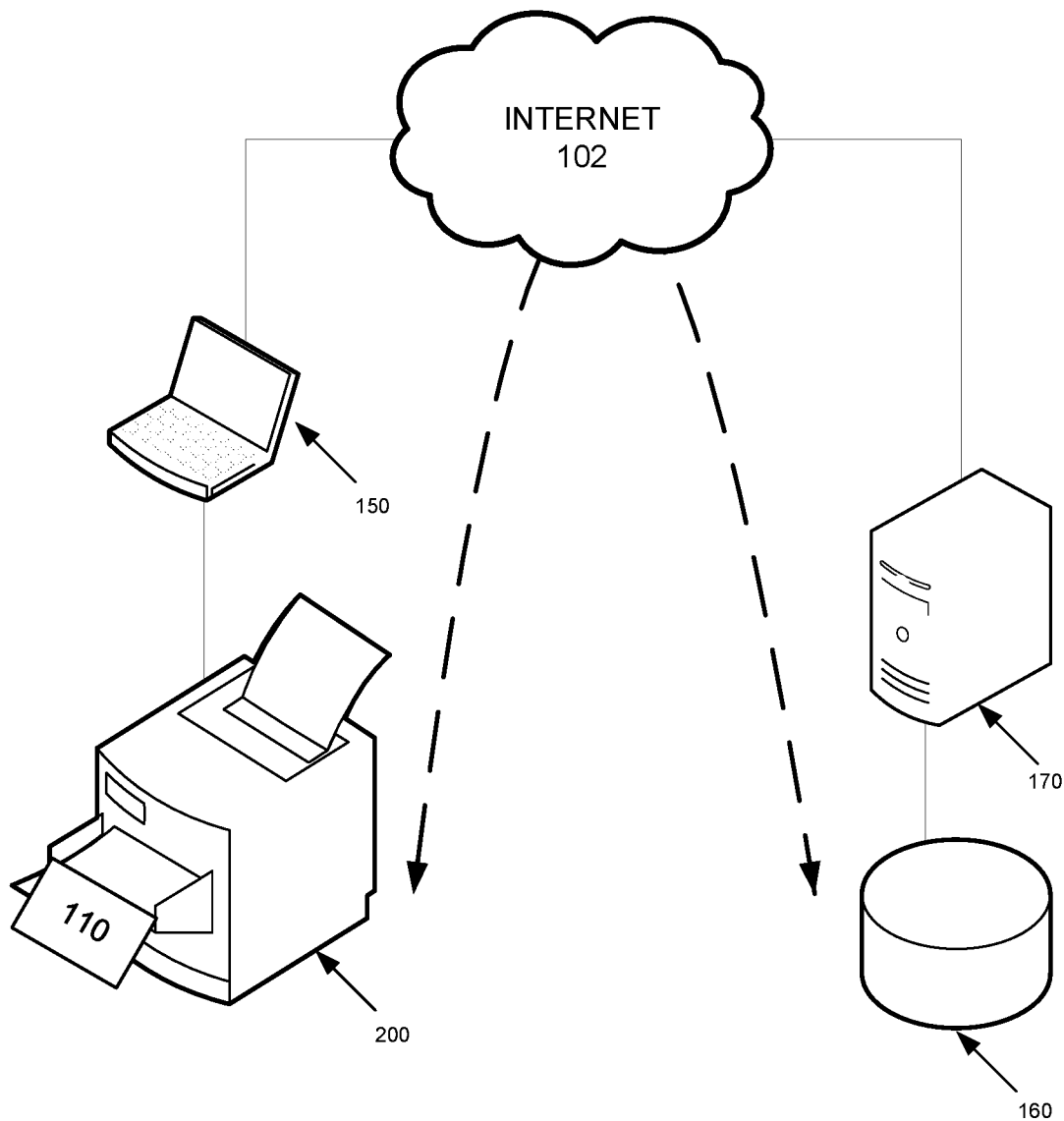
FIG. 3 illustrates a network configuration of the system devices included in a smart label provisioning process according to example embodiments.

FIG. 3 illustrates a network configuration of the system devices included in a smart label provisioning process according to example embodiments. Referring to FIG. 3, the example network configuration demonstrates the devices which may be necessary to achieve a communication flow of information from the printer 200 and the initial provisioning of the smart label 110 all the way to the master server 170 and the corresponding database 160 which stores the records of the labels and their corresponding identifier information. The local computer 150 may provide an access point for the label 110 and/or the printer 200 to send/receive messages which are sent and received across the Internet 102 to a remote server 170 and/or a corresponding database that manages the lifespan and updates associated with the smart labels.

Figure 4:
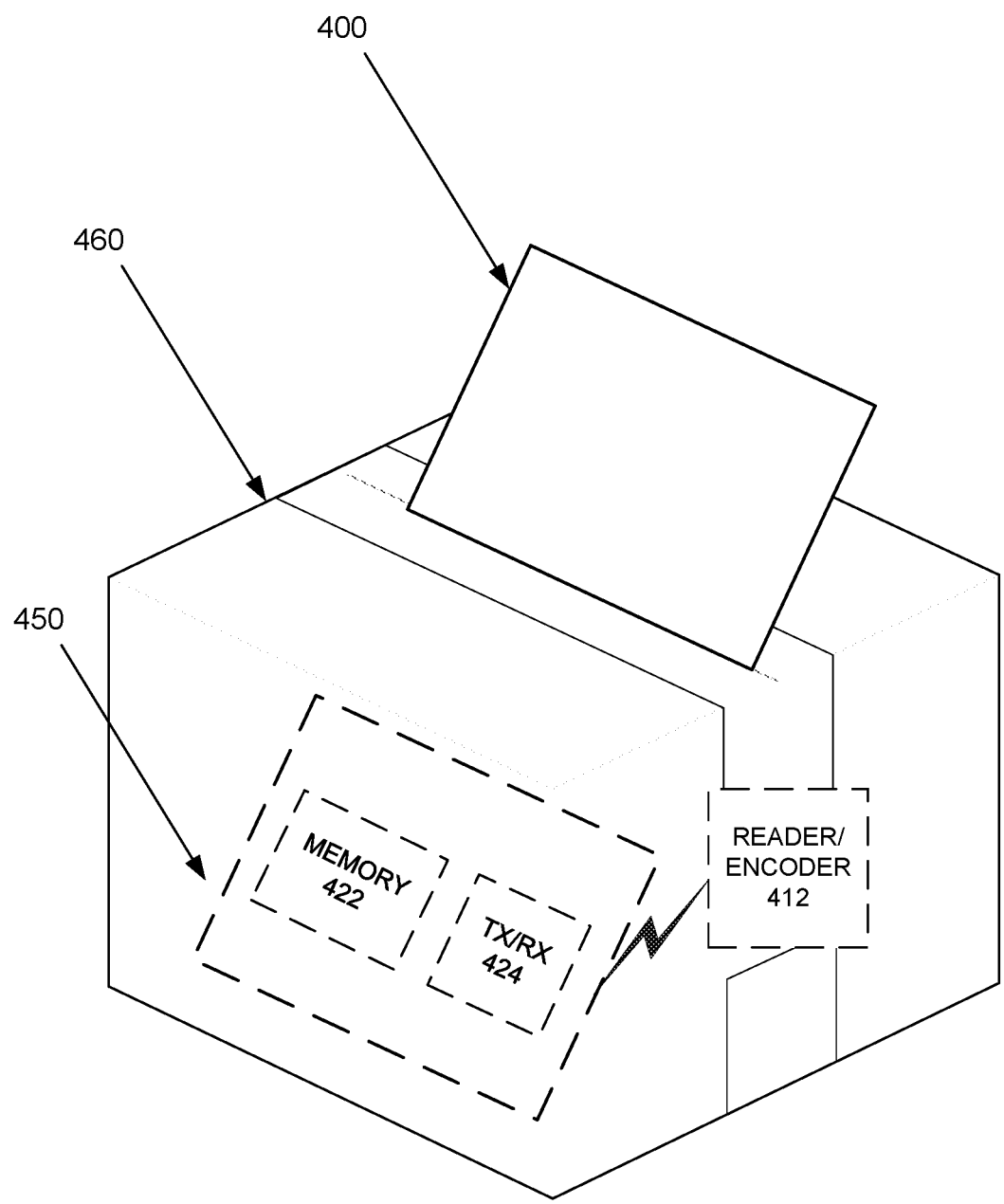
FIG. 4 illustrates an example of a smart label being activated and/or provisioned by an encoder during an activation procedure according to example embodiments.

FIG. 4 illustrates an example of a smart label being activated and/or provisioned by an encoder during an activation procedure according to example embodiments. Referring to FIG. 4, the example includes a printer or container 460, which may be desktop printer or storage type of container that is used to keep the stack of labels in a fixed position or to avoid the stack becoming disheveled. In this example, the topmost smart label 400 is slidably moved up through a slot in the container 460, which may be a printer feeder for multiple papers or a place to rest a stack of labels. The smart label 400 may be the next label to be fed into a smart label printer. The stack of other smart labels 450 are located inside the container 460 and may be fan-folded in an alternating and overlapping position so each smart label is resting on top of one another.

As the labels are moved past a reader/encoder 412 which uses radio transmissions to communicate with the label 450 (nearest the reader), a radio signal may excite or power-up the label 450 by transmitting a radio signal to the antenna or radio transmitter/receiver 424, which accesses the memory of the label so information can be read, written, erased, overwritten, recorded, etc. In the case of the container being a printer, when the label enters the print area, the label may be dormant or unactive (not transmitting or receiving a data signal) and by the time the label 450 has moved out of the container or printer, the label may have print on a top surface and may be broadcasting a newly assigned identifier to the radio communication entities nearby which are monitoring for radio communications. Also, cellular, BLUETOOTH (BLE) and/or other wireless communication protocols may also be used for communicating with the label by nearby monitoring devices. A label's information can be recorded along with a date, time, GPS coordinates, etc., to record for audit purposes especially when the label is paired with a package for shipping purposes.

A smart label passing through a RFID printer may energize the RFID portion of the label to read a unique ID, access data and read or write to a memory over a RF signal. The location of the label may enable the activation and provisioning (turning on and/or recording of information onto the label) of the label if it is activated by the encoder. The microcontroller when energized may check the RFID unique ID and other memory contents, if the content has changed since a previous check, the label may attempt to broadcast the new information for a set period of time. If the information is not new, there may be no effort to write the information to memory or to broadcast the new information.

Figure 5A:
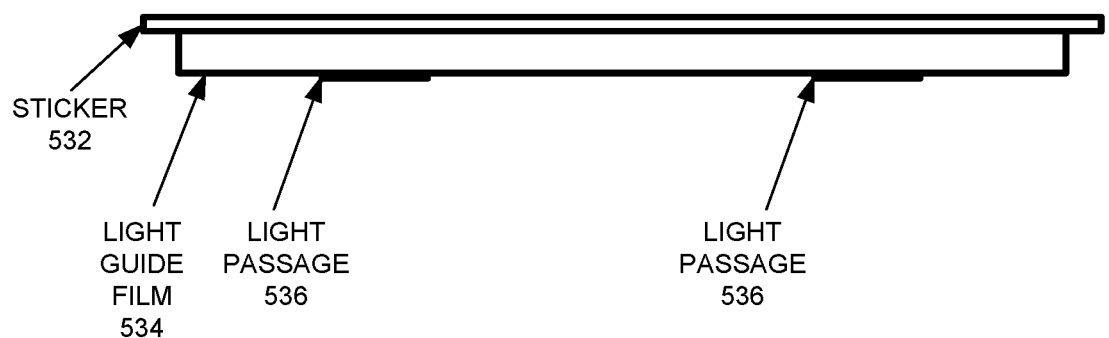
FIG. 5A illustrates an example side view for a smart label with a light sensing capability according to example embodiments.

FIG. 5A illustrates an example side view for a smart label with a light sensing capability according to example embodiments. Referring to FIG. 5A, the smart label may be activated and/or provisioned by a light source. An LED and/or ambient light sensor may be used to operate as an intelligent switch. A light channel or passage may have a sticker to cover an LED and ambient light sensor which permits the light to propagate along the guide film 534 from a light source to a light sensor via the light passage channels/tubes 536. Removing the obstruction in the light and sensor path may enable the smart label to wake-up from a dormant state to a normal operation where broadcasting occurs. Also, the strobes of light or impulses may be performed in different patterns to cause the microcontroller to perform different operations. The example may include a sticker portion 532 from the side view example which is over a light guide film 534 where light can pass through. Removing the sticker 532 may permit a light source from a remote source, such as a light reader/activator to activate the smart label controller. Alternatively, the light may be a constant source of light that propagates from a light source internal to the label to a light sensor also internal to the label. The constant light impulses may be used to maintain the light impulses which may cause the label to maintain a dormant state. In the absence of a light source, such as when the reflective sticker 532 is removed and the light can pass through the film 534 and does not propagate along the film from one end (the light source) to the other (the light sensor), then that may cause the label to activate when the light is no longer detectable. The microcontroller may operate to remain dormant when the light is continuously received and to initiate an active state when the light is no longer present.

Figure 5B:
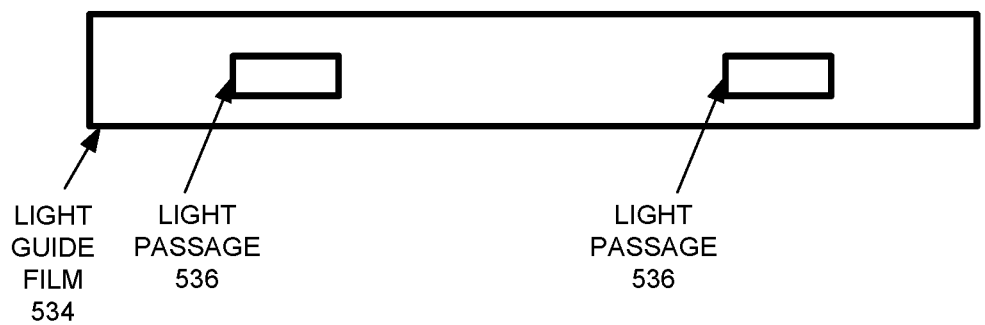
FIG. 5B illustrates an example bottom view for a smart label with light sensing capability according to example embodiments.

FIG. 5B illustrates an example bottom view for a smart label with light sensing capability according to example embodiments. Referring to FIG. 5B, the bottom view demonstrates the light passages 536 where the light can pass. Two example states may include a light sticker state where the device is in a dormant state and may transmit a signal once a day to share its status. The removal of the light pipe sticker may enable an operation where the device is effectively turned on to operate with a greater frequency.

Figure 5C:
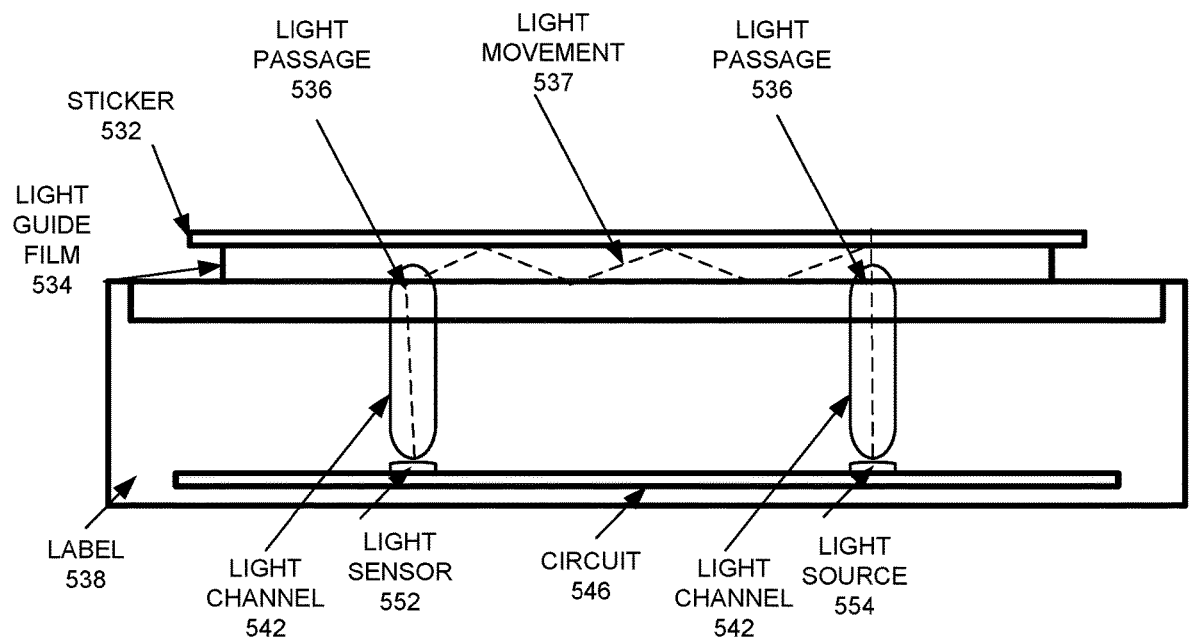
FIG. 5C illustrates an example side view of a smart label with light creating and sensing capability with a reflective surface according to example embodiments.

FIG. 5C illustrates an example side view of a smart label with light creating and sensing capability with a reflective surface according to example embodiments. Referring to FIG. 5C, the label 538 is illustrated with an area in the light guide film 534 where the light 537 can pass to a sensor 552 from a light source 554 via the light channels. The circuit 546 controls the operation of the label to operate based on the signals from the light. The circuit 546 may include any one or more of the components of FIGS. 1A and 1B along with the additional components illustrated in FIG. 5C. The top of the label and the reflective surface of the removable sticker 532 may permit light to reflect along the label to activate the light sensor 552 and cause a maintained status (no change), or, alternatively, a change of control functions to the microcontroller (not shown) which is also part of the label 538. In operation, the sticker 532 may be peeled off via an automated removal process of a printer, a conveyor system or other moving component to activate the label 538. A strobe LED light signal pattern from a remote source may also be used to enable the label to come out of a dormant state or to move back to a dormant state. Light may propagate along the light guide film 534 so a light source can be detected by the light sensor 552. Different light patterns which are detected can cause different resulting operations to occur, such as activation of different broadcasting intervals (e.g., once a day, once a week, once and hour, etc.). It is important to note, that the continuous or oscillating cycle of light impulses may be necessary to maintain a dormant/stealth/sleep status of the label. The dormant state may be a state where no activity is performed, a stealth state may be similar but may include a periodic and infrequent beacon signal to be sent to listening devices, and a sleep state may be a state where the label is not used for any purpose but periodically awakens to provide a beacon signal after a certain amount of time. Alternatively, an activate state is one where the RFID, radio, BLE, and/or cellular signals are sent from the label to notify listening devices of the label's presence, ID, location, etc.

Figure 5D:
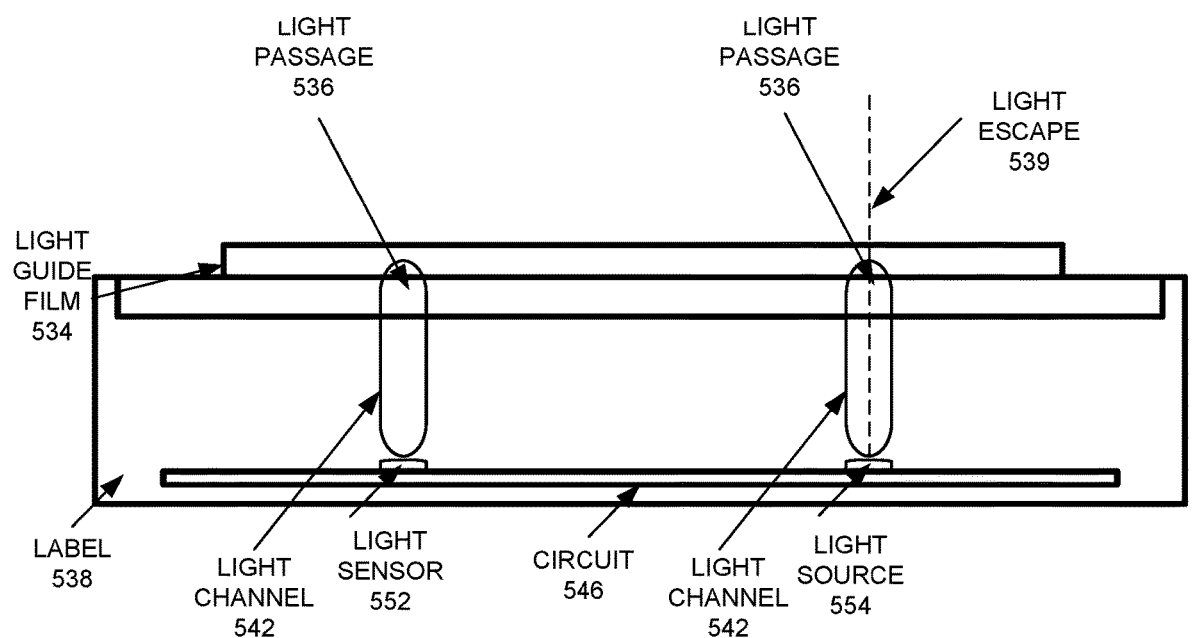
FIG. 5D illustrates an example side view of a smart label with light creating and sensing capability without a reflective surface according to example embodiments.

FIG. 5D illustrates an example side view of a smart label with light creating and sensing capability without a reflective surface according to example embodiments. In this example, the sticker 532 was removed either via a manual operation or an automated operation. The removal may be a simple scrapping movement that permits the light to pass through the top surface of the light guide film. In this example, the light has escaped 539 and is not detectable by the light sensor 552 with the removal of the reflective film of the sticker 532. This lack of light detected may cause the sticker to activate and begin seeking an update for ID information, broadcasting information to any listening sources, change a broadcasting interval from once in a long while, such as once a week, to once a day or even more frequent, etc. In another example, when the film is removed, the outside light sources, such as a light in a printer may be able to activate the label via a specific set of light impulses which cause a modification to occur to the status of the label. The microcontroller may be enabled by the repetition of light impulses, and different impulse patterns may enable different types of operations, such as a digital language of instructions to establish a status of the label.

In operation, a light impulse may be detected when an ambient light threshold is exceeded. The interrupt may cause a change to the microcontroller status. When the device is in stealth mode, the light may act as a switch that enables the microcontroller to begin operation. The flash of light may come from a bar code reader when the label is passed through a reader or other device and the protective layer or removed. In another example, the label may not have a protective layer and the light may be shined onto a sensor on the label to activate the label. The light may be from an automate source when the label is being conveyed across a printer or other type of movement device.

Figure 6:
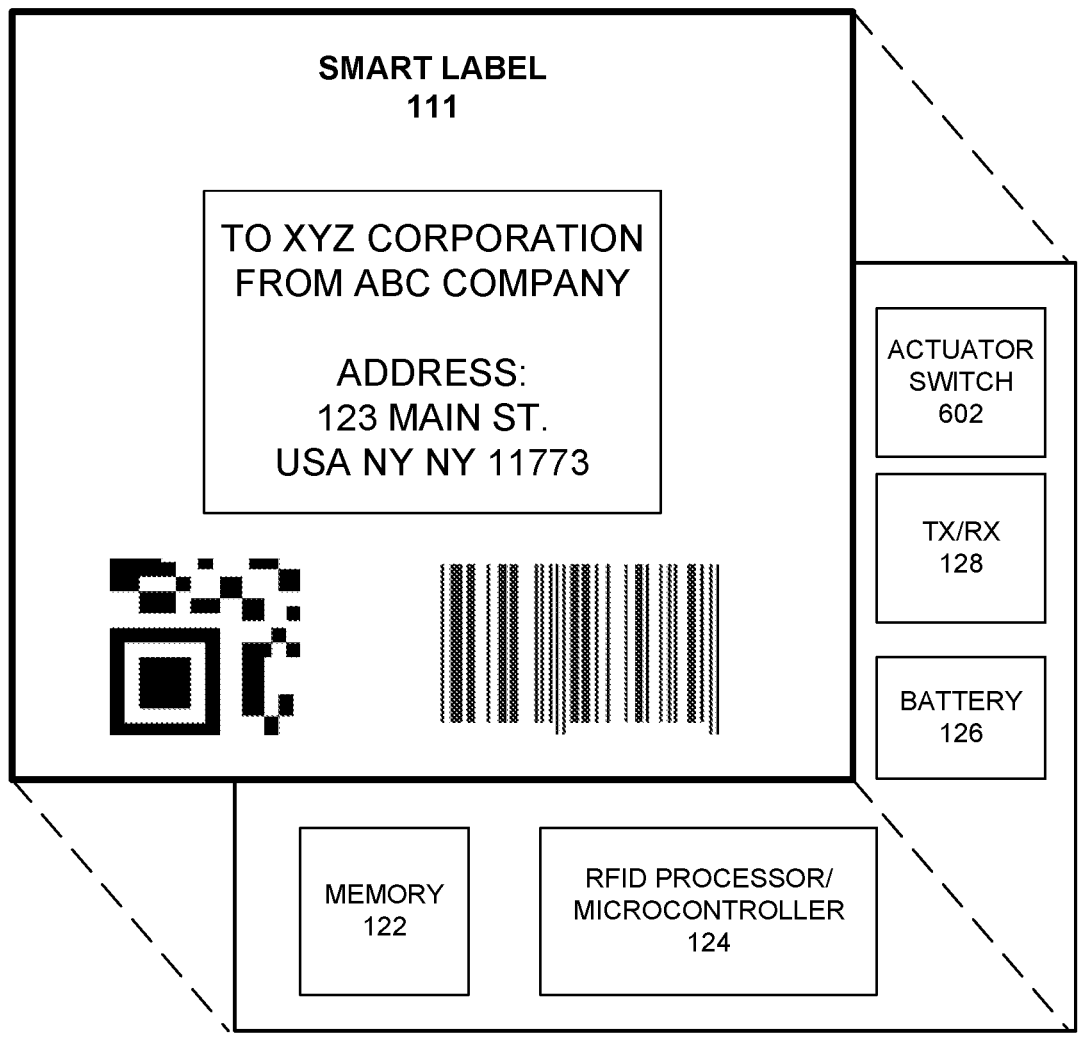
FIG. 6 illustrates an example smart label with an actuator switch to enable activation according to example embodiments.

FIG. 6 illustrates an example smart label with an actuator switch to enable activation according to example embodiments. Referring to FIG. 6, the smart label 111 is similar to the smart label 110, however, an actuator switch 602 is included which enables a short or open circuit to occur which causes the smart label to activate and to achieve power transfer from a battery 126. One example includes a switch which is activated when the label 111 moves through a printer or other movement creating device. The printing process causes a small switch 602 to be pressed which causes the power to transfer from a power source (battery) to the microcontroller and certain operations may then occur, such as reading, writing, broadcasting, etc., information to and from the switch. The switch 602 may be enabled by a pressing operation, a tearing operation, a certain amount of weight pressed against the label, a lack of weight being lifted from a surface of the label, etc. The activation of the switch causes the label to activate or deactivate. A single actuation may cause the switch to awaken and begin broadcasting information via the radio transceiver 128 or to shutdown and go to a sleep or dormant state. In one example, the printer roller will roll over the actuation button 602. The pressure switch may be a simple wire short or a capacitor switch where the capacitance changes as the distance between layers of the label are manipulated by a pressing action. Then, the current applied to the capacitor would have its characteristics varied which could be interpreted as a change in operation. A resistive element could also be used. Having the change in physical space of the label could press against the resistive element to modify a resistive characteristic which could be interpreted as a change that activates the resistive switch element.

Figure 7:
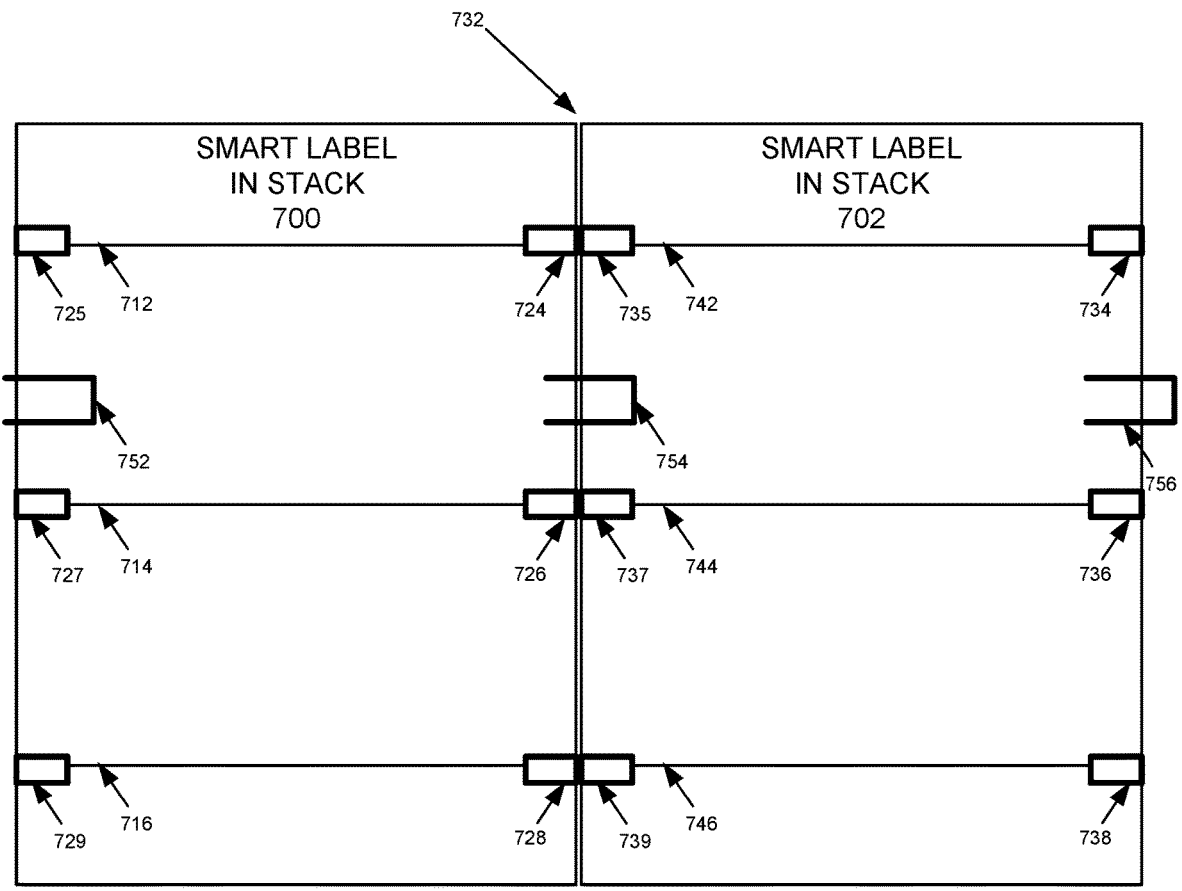
FIG. 7 illustrates an example of a smart label stack with tear activation according to example embodiments.

FIG. 7 illustrates an example of a smart label stack with a tear activation according to example embodiments. Referring to FIG. 7, the example includes two smart labels 700 and 702 still attached and prior to being separated. The first label 700 has a set of conduits and contact pads 725, 727, 729 on one side and another set 724, 726 and 728 on another side which are in contact with the contact pads 735, 737 and 739 of the second smart label 702. The other sets of contact pads and leads 734, 736 and 738 may be connected to another label in a stack (not shown). The center line 732 may be perforated for an easy tear operation by hand or by a machine motorized movement mechanism, such as a printer. There may be certain leads or wires 752, 754 and 756 at each junction of the label to enable an activation, for example, when one label 700 is torn at axis 732 from another 702, the wire 754 may be removed as a short or open circuit to enable a power activation that enables reading, writing, broadcasting, etc., to occur inside the label(s).

Figure 8A:
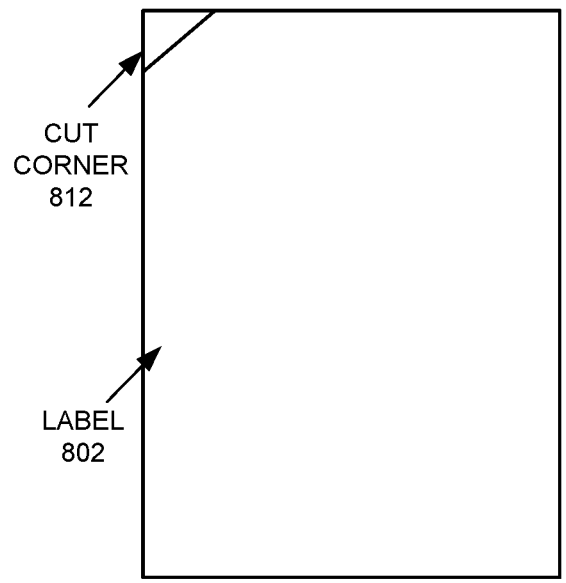
FIG. 8A illustrates a smart label with a tearable corner according to example embodiments.

FIG. 8A illustrates a smart label with a tearable corner according to example embodiments. The term 'tearable' means that the element may be torn to enable a type of action and without frustrating the operation of the device. Referring to FIG. 8A, the label 802 may have one or more corners which can be 'engaged', such as bent, ripped or torn away. The act of 'engaging' the corner can cause the activation to occur in a manner similar to the tearing operation demonstrated in FIG. 7. This enables power activation, broadcasting, storing, writing, reading, etc., to occur. For example, a label 802 may not broadcast anything. When the corner 812 is ripped away or bent or pressed, the label may broadcast once a day or at some other predetermined time interval and/or perform other operations.

Figure 8B:
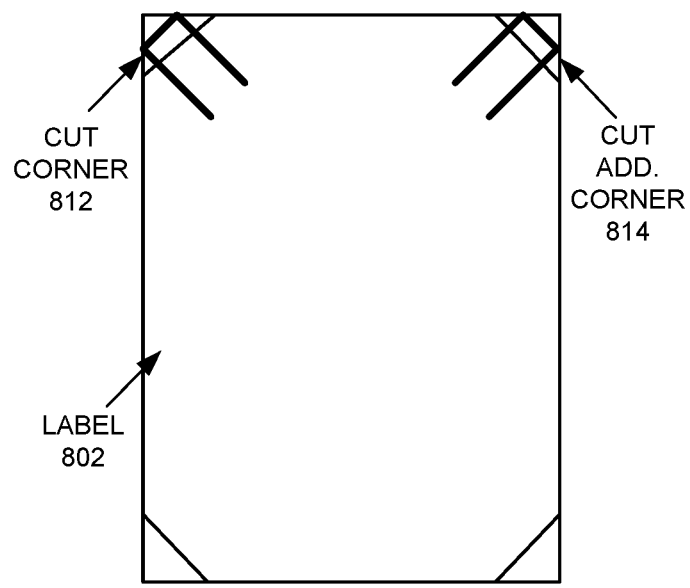
FIG. 8B illustrates a smart label with multiple tearable corners according to example embodiments.

FIG. 8B illustrates a smart label with multiple tearable corners according to example embodiments. Referring to FIG. 8B, the example includes a label 802 with multiple corners which are wired or rigged with a lead that when ripped away or manipulated can cause a certain operation to occur. For example, when a first corner is cut 812 the label may broadcast for 24 hours and then stop and become dormant. The second label corner 814, when cut, can trigger another 24 hours of broadcasting. This process may repeat for each corner cut with a lead attached to a circuit that enables the power to activate the microcontroller. Also, a first corner being cut may enable a once per 24-hour broadcast operation to occur. A second corner being cut may enable an every hour broadcast operation to occur. The different options are all part of the label's capability to enable a circuit and activation process.

Figure 8C:
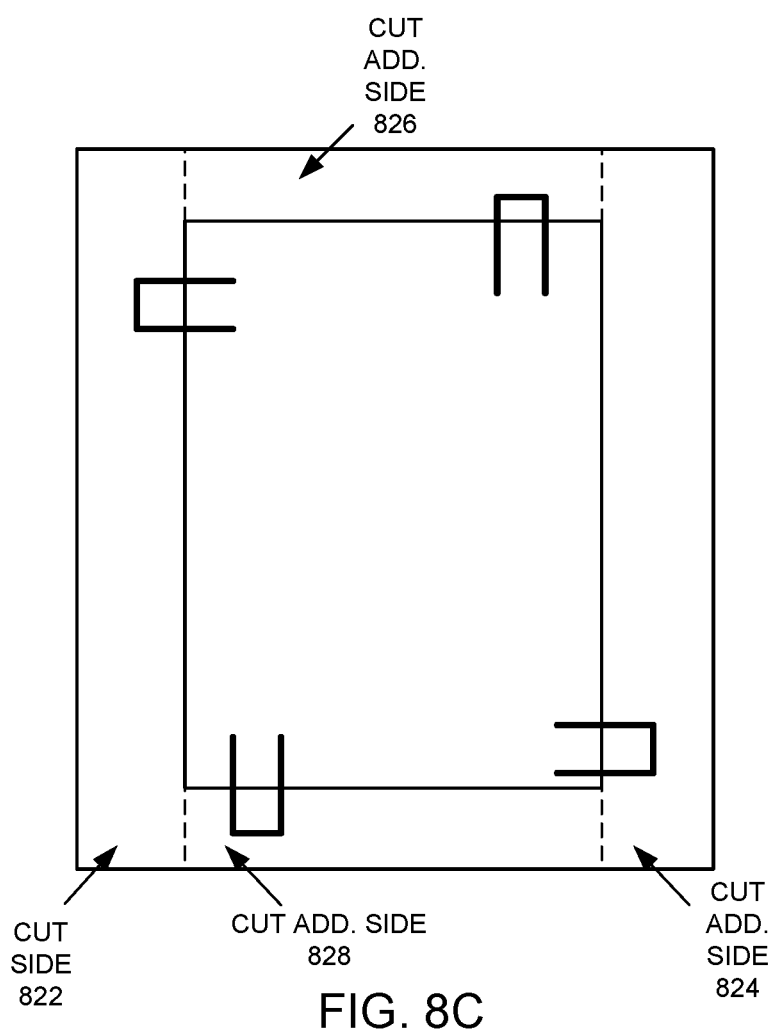
FIG. 8C illustrates a smart label with various tearable edges according to example embodiments.

FIG. 8C illustrates a smart label with various tearable edges according to example embodiments. Referring to FIG. 8C, the alternative label edges demonstrate four sides to a label. The first side to be cut could be 822 or 824 prior to attempting to cut 826 or 828. The first side, for example, 822 may enable a power enable function. A label may use internal pull-up or pull-down power by enabling an input and output connection that reverses potential when the connection is cut. Each side may enable a different function, for example, cutting 822 may enable a once a week beach broadcast, the side 824 being cut may enable a once a day broadcast, the third side 826 may enable a download function to retrieve additional information and the last side 828 may enable a different communication medium, such as cellular to be used in the final stage of transit of the label where the other protocols used prior to the last side being cut were all RFID radio transmissions. Each corner being manipulated or cut could cause the microcontroller to perform another operation or to thwart a previous operation by the voltage that is applied as a result of each of the corner manipulations.

Figure 9A:
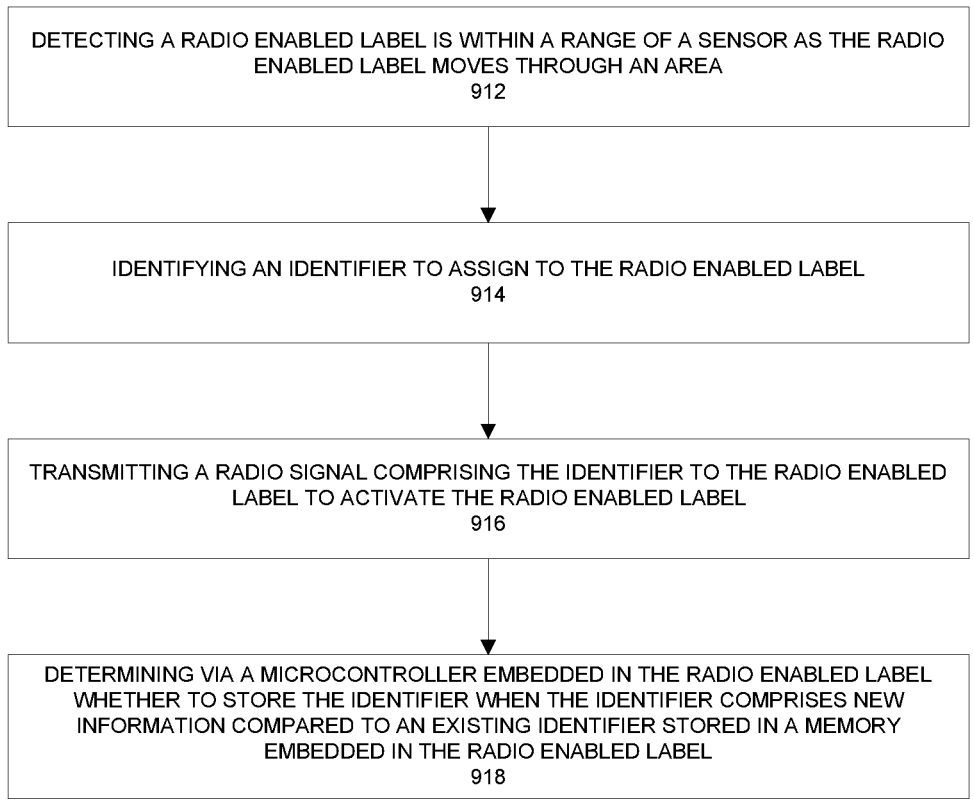
FIG. 9A illustrates an example method of provisioning a smart label according to example embodiments.

FIG. 9A illustrates an example method of provisioning a smart label according to example embodiments. Referring to FIG. 9A, the example method includes detecting a radio enabled label is within a range of a sensor as the radio enabled label moves through an area 912. The area may be a radio transceiver that can communicate with the label. The radio element may be inside a printer or other device that manages the printing and use of labels, such as a conveyor or other device that moves a label along a particular area. The method may also include identifying an identifier to assign to the radio enabled label 914 from a list of identifiers stored in a remote database in communication with the device that is assigning the identifiers. The identifiers may be part of an ordered system of identifiers which are stored in a database for future reference purposes, such as when the identifier is located at a particular location at a later date. The method may also include transmitting a radio signal comprising the identifier to the radio enabled label to activate the radio enabled label 916, and determining via a microcontroller embedded in the radio enabled label whether to store the identifier when the identifier comprises new information compared to an existing identifier stored in a memory embedded in the radio enabled label 918. The radio signal may cause the label to awaken and begin a software based process that includes determining a current identifier assigned to the label, writing/reading information to and from the label memory and other operations.

The method may also include storing the identifier in the memory when the identifier includes new information not previously stored in the memory, such as a unique identifier that is not already stored in label. The method may also include maintaining an active status of the radio enabled label for a period of time, such as a status where the radio signals sent and received by the label are performed and recognized by the label for a period of time. The method may also include disregarding the identifier by the microcontroller when the identifier incudes information that was previously stored in the memory, and disabling the active status of the radio enabled label. When the identifier is unique, the label may perform some actions, such as write the identifier to memory, transmit a radio signal indicating that the identifier is stored and continuing to broadcast that identifier for a period of time until the label is dormant again and in an energy saving mode of operation or is not being prompted by a radio device to provide information via radio signals. The method may also include printing information on a surface of the radio enabled label during the detecting process. The sensor may be one or more of a radio sensor that transmits and receives radio signals to identify the radio enabled label, a motion sensor that senses motion and a vibration sensor that senses the radio enabled label is moving within a predefined distance.

Figure 9B:
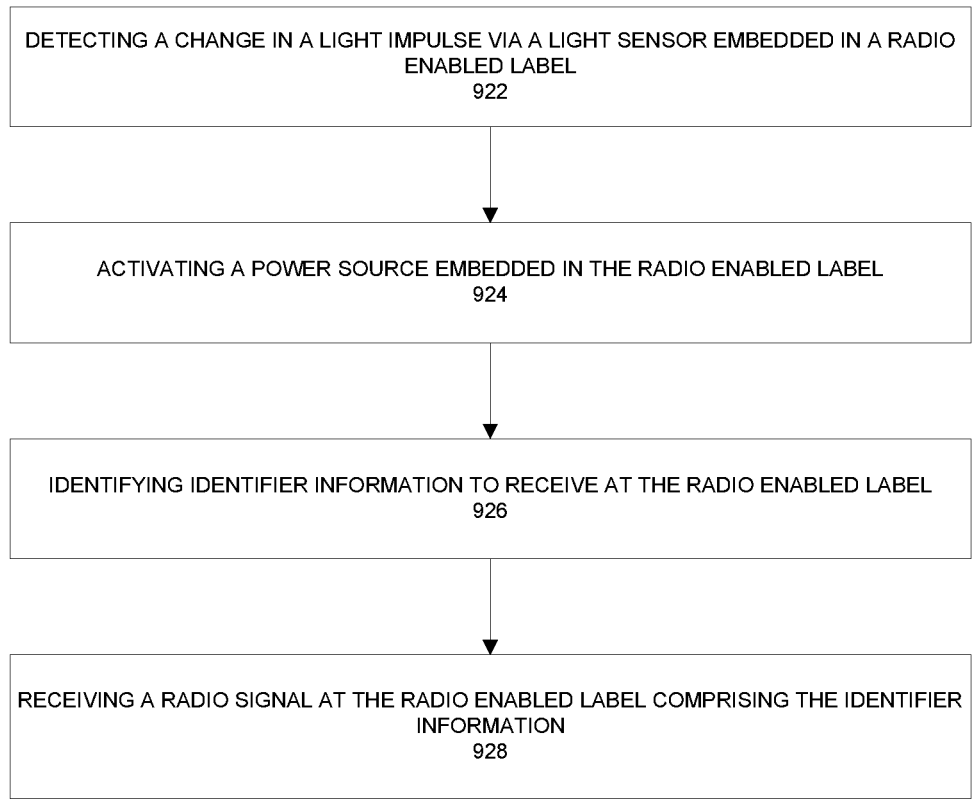
FIG. 9B illustrates an example method of operating a smart label with a light according to example embodiments.

FIG. 9B illustrates an example method of operating a smart label with a light according to example embodiments. Referring to FIG. 9B, the method may include detecting a change in a light impulse via a light sensor embedded in a radio enabled label 922. The change may be a light that is detected that was not previously detected, the change may be a temperature change caused by the light and detected by a sensor, the change may also be a lack of light signals that are not detected and which were previously detected, and that may cause a change to occur in the label operation. The method may also include activating a power source embedded in the radio enabled label 924. The power source may be a small battery that is embedded in the label body (i.e., paper, plastic, etc.). The activation may be caused by a signal sent to the microcontroller which is in communication with the elements of the label. The method may also include may also include identifying identifier information to receive at the radio enabled label 926, such as a new identifier to assign to the label, a confirmation message that includes the identifier of the label, or an identifier stored in the label which can be cross-referenced with information received to ensure the correct information is stored, sent and/or received. The method may also include receiving a radio signal at the radio enabled label including the identifier information 928.

The light impulse may be produced by a light source including a light emitting diode (LED) that is embedded in the radio enabled label. The internal light may be used to maintain regular operation of the label and may also be used to change the operation of the label by a sensor that detects the light inside the label and performs changes based on the detected light or the lack of detected light. Also, the method may also include detecting one or more additional light impulses after the detected change in the light impulse, and responsive to the one or more additional light impulses detected, determining whether to continue activation of the power source, deactivate the power source and write information to a memory embedded in the radio enabled label. The repetition of light impulses may be used to perform different operations as detected by the sensor and interpreted by the microcontroller. The information stored in the memory may be used to control the microcontroller to perform different operations depending on the information detected. For example, the light impulse may include a first number (N) of light impulses and the one or more additional light impulses may include a second number (N+1) of light impulses each of which are for performing a different operation.

The method may also include determining via a microcontroller embedded in the radio enabled label whether to store the identifier information in a memory embedded in the radio enabled label. The decision to store information, write over previous information, etc., may be based on instructions executed by the microcontroller. Also, maintaining an active status of the radio enabled label for a period of time, then after the period of time has matured, deactivating the active status and turning the power source off, is another operation that may be performed automatically to ensure the battery is saved but the label attempts to share its information. The method may also include where the detecting the change in the light impulse includes detecting a lack of light impulses, and responsive to detecting the lack of the light impulses, activating the power source embedded in the radio enabled label.

Figure 9C:
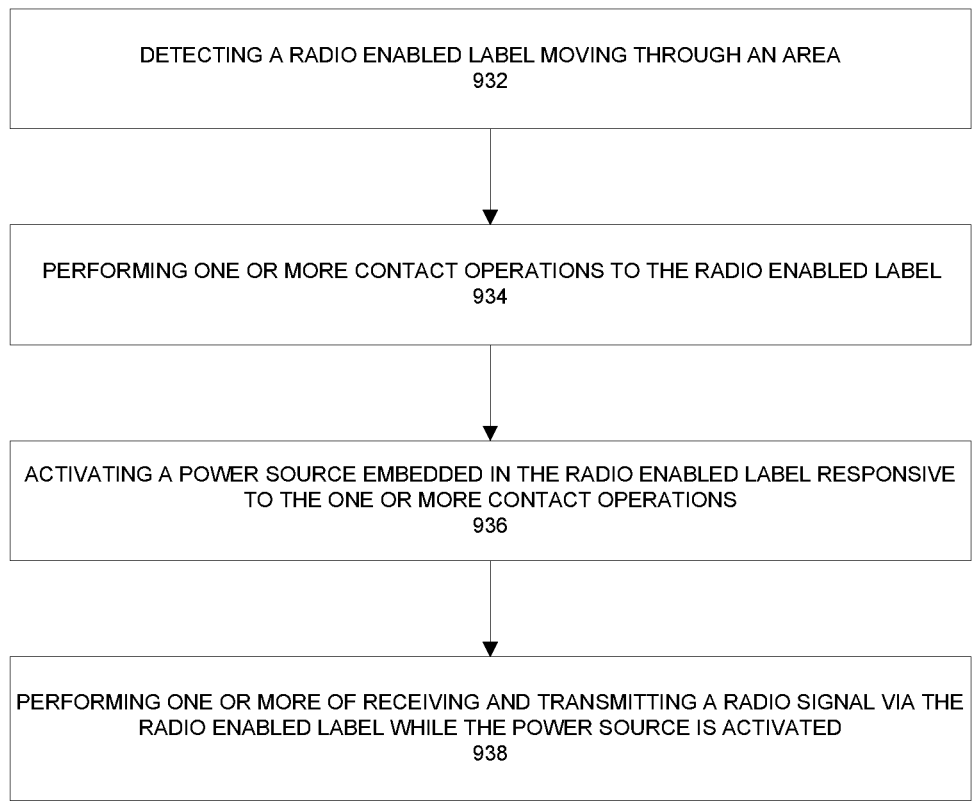
FIG. 9C illustrates an example method of operating a smart label via a contact operation according to example embodiments.

FIG. 9C illustrates an example method of operating a smart label via a contact operation according to example embodiments. Referring to FIG. 9C, the example method includes detecting a radio enabled label moving through an area 932, and performing one or more contact operations to the radio enabled label 934. This example may include a conveyer or printer device that feeds a label through an area and enables the use of the label by a roller or other mechanical device that comes into contact with the label. The contact may be hard or soft but may be enough of a contact pressure to actuate a switch, tear a corner of the label, etc. The method may also include activating a power source embedded in the radio enabled label responsive to the one or more contact operations 936, and performing one or more of receiving and transmitting a radio signal via the radio enabled label while the power source is activated 938.

In one example, the performing of the one or more contact operations to the radio enabled label may include tearing the radio enabled label away from an additional radio enabled label along an axis, and the tearing removes an electrical short connection enabling the activating of the power source. The performing of the one or more contact operations to the radio enabled label may include an actuating movement that applies pressure to a portion of the radio enabled label with a switch, and the actuating movement enables the switch to perform activation of the power source to control the microcontroller to initiate one or more operations.

Another example may include tearing an edge of the radio enabled label by tearing a first edge of the radio enabled label to enable a first mode of operation and the tearing an edge of the radio enabled label by tearing a second edge of the radio enabled label to enable a second mode of operation. The edge of the label being manipulated (ripped, torn, bent, etc.) may enable a short or open circuit to occur via a wire that is in the area of the tear and which is directly or indirectly tied to the microcontroller. A first mode of operation may include broadcasting a radio signal for a first period of time and the second mode of operation may include broadcasting a radio signal for a second period of time that is a longer duration than the first period of time. Also, a first mode may be using RFID signals to communicate and a second mode may include using BLE and/or cellular to communicate.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 10:
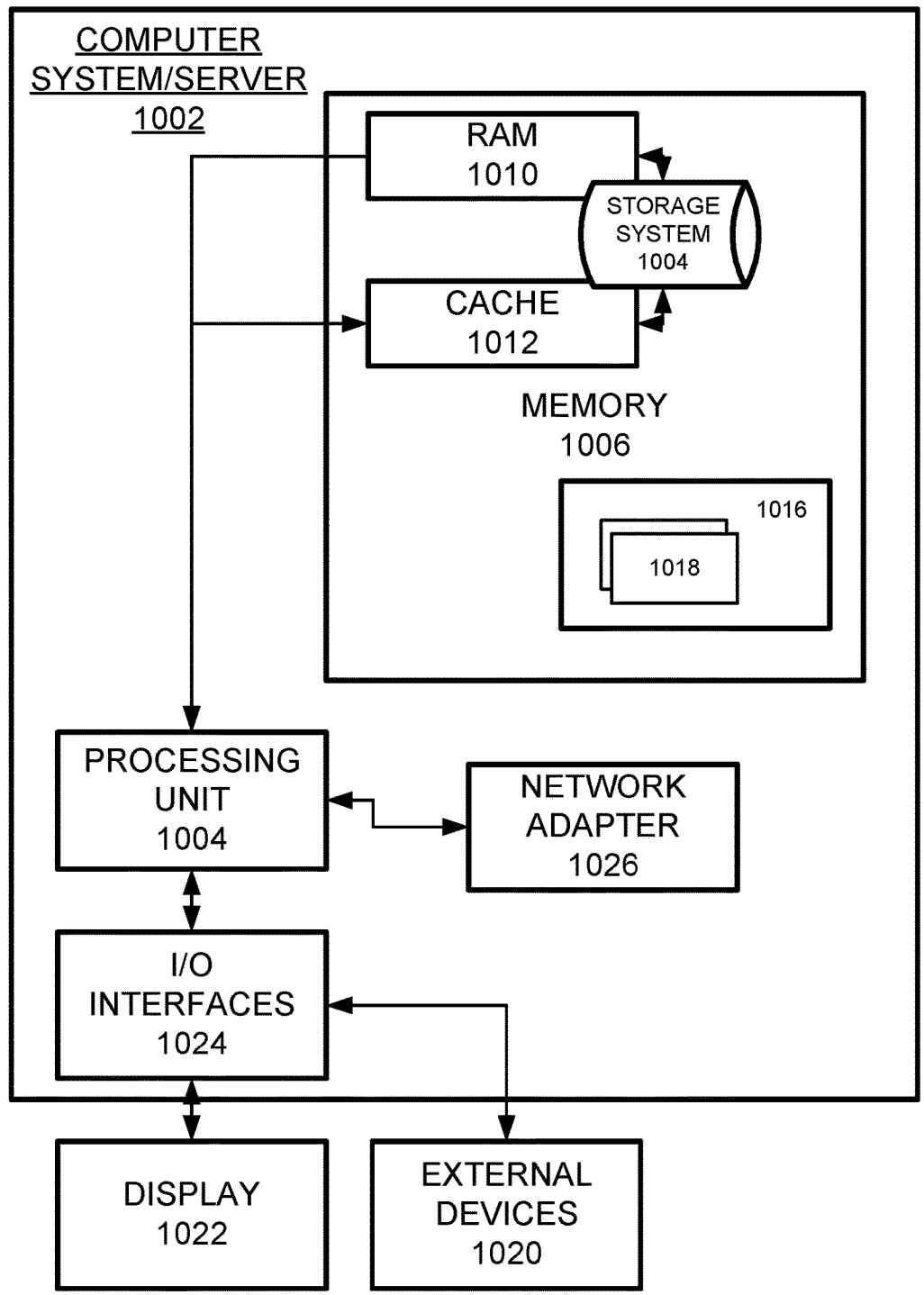
FIG. 10 illustrates a system configuration for storing and executing instructions for any of the example processes according to example embodiments.

FIG. 10 is not intended to suggest any limitation as to the scope of use or functionality of embodiments of the application described herein. Regardless, the computing node 1000 is capable of being implemented and/or performing any of the functionality set forth hereinabove.

In computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 10, computer system/server 1002 in cloud computing node 1000 is displayed in the form of a general-purpose computing device. The components of computer system/server 1002 may include, but are not limited to, one or more processors or processing units 1004, a system memory 1006, and a bus that couples various system components including system memory 1006 to processor 1004.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media. System memory 1006, in one embodiment, implements the flow diagrams of the other figures. The system memory 1006 can include computer system readable media in the form of volatile memory, such as random-access memory (RAM) 1010 and/or cache memory 1012. Computer system/server 1002 may further include other removable/non-removable, volatile/non-volatile computer system storage media. By way of example only, storage system 1014 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1006 may include at least one program product having a set (e.g., at least one) of program modules that are configured to carry out the functions of various embodiments of the application.

Program/utility 1016, having a set (at least one) of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via a bus. It should be understood that although not displayed, other hardware and/or software components could be used in conjunction with computer system/server 1002. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   detecting a radio-enabled label moving through an area; and
   performing one or more contact operations on the radio-enabled label, wherein the one or more contact operations physically contact the radio-enabled label to activate a power source embedded in the radio-enabled label to enable the radio-enabled label to at least one of transmit or receive a radio signal, wherein tearing a first edge of the radio-enabled label enables a first mode of operation by the radio-enabled label, wherein tearing a second edge of the radio-enabled label enables a second mode of operation by the radio-enabled label.

2. The method of claim 1, wherein the area is a printer.

3. The method of claim 1, wherein the performing of the one or more contact operations further comprises:
   tearing the radio-enabled label away from an additional radio-enabled label along an axis,
   wherein the tearing removes a shorted electrical connection, activating of the power source.

4. The method of claim 1, wherein the performing of the one or more contact operations further comprises:
   applying pressure to a portion of the radio-enabled label comprising a switch via an actuating movement, wherein the actuating movement enables the switch to activate the power source.

5. The method of claim 1, wherein the first mode of operation comprises broadcasting the radio signal for a first period of time, and
   the second mode of operation comprises broadcasting a radio signal for a second period of time that is a longer duration than the first period of time.

6. An apparatus, comprising:
   a processor that, when executing instructions stored by a memory, is configured to:
   detect a radio-enabled label moving through an area; and
   perform one or more contact operations on the radio-enabled label, wherein the one or more contact operations physically contact the radio-enabled label to activate a power source embedded in the radio-enabled label to enable the radio-enabled label to at least one of transmit or receive a radio signal, wherein a first edge of the radio-enabled label is torn to enable a first mode of operation, wherein a second edge of the radio-enabled label is torn to enable a second mode of operation.

7. The apparatus of claim 6, wherein the area is a printer.

8. The apparatus of claim 6, wherein to perform the one or more contact operations to the radio-enabled label comprises the radio-enabled label being torn away from an additional radio-enabled label along an axis, and wherein the tear removes an electrical short connection to enable the activation of the power source.

9. The apparatus of claim 6, wherein when the processor performs the one or more contact operations, the processor is further configured to:

control the apparatus to apply pressure to a portion of the radio-enabled label comprising a switch via an actuating movement, wherein the actuating movement enables the switch to activate the power source.

10. The apparatus of claim 6, wherein the first mode of operation comprises broadcasting a radio signal for a first period of time, and the second mode of operation comprises broadcasting the radio signal for a second period of time that is a longer duration than the first period of time.

11. A non-transitory computer-readable storage medium configured to store instructions that, when executed by a processor, cause the processor to perform:

detecting a radio-enabled label moving through an area; and performing one or more contact operations on the radio-enabled label, wherein the one or more contact operations physically contact the radio-enabled label to activate a power source embedded in the radio-enabled label to enable the radio-enabled label to at least one of transmit or receive a radio signal, wherein tearing a first edge of the radio-enabled label enables a first mode of operation by the radio-enabled label, wherein tearing a second edge of the radio-enabled label enables a second mode of operation by the radio-enabled label.

12. The non-transitory computer-readable storage medium of claim 11, wherein the area is a printer.

13. The non-transitory computer-readable storage medium of claim 11, wherein the performing of the one or more contact operations further comprises:

tearing the radio-enabled label away from an additional radio-enabled label along an axis, wherein the tearing removes a shorted electrical connection, activating of the power source.

14. The non-transitory computer-readable storage medium of claim 11, wherein the performing of the one or more contact operations further comprises:

applying pressure to a portion of the radio-enabled label comprising a switch via an actuating movement, wherein the actuating movement enables the switch to activate the power source.

\* \* \* \* \*